United States Patent [19]
Stava

[11] Patent Number: 6,111,216
[45] Date of Patent: Aug. 29, 2000

[54] HIGH CURRENT WELDING POWER SUPPLY

[75] Inventor: Elliott K. Stava, Sagamore Hills, Ohio

[73] Assignee: Lincoln Global, Inc., Cleveland, Ohio

[21] Appl. No.: 09/233,235

[22] Filed: Jan. 19, 1999

[51] Int. Cl.[7] .................................................. B23K 9/09
[52] U.S. Cl. ................................ 219/130.51; 219/137 PS
[58] Field of Search ......................... 219/130.51, 137 PS, 219/130.31, 130.32, 130.33, 130.21

[56] References Cited

U.S. PATENT DOCUMENTS

| | | | |
|---|---|---|---|
| 4,564,742 | 1/1986 | Karlsson | 219/130.33 |
| 4,861,965 | 8/1989 | Stava . | |
| 4,876,433 | 10/1989 | Kashima et al. | 219/130.51 |
| 4,947,021 | 8/1990 | Stava . | |
| 5,001,326 | 3/1991 | Stava . | |
| 5,349,157 | 9/1994 | Blakenship . | |
| 5,351,175 | 9/1994 | Blakenship . | |
| 5,434,768 | 7/1995 | Jitaru et al. . | |

*Primary Examiner*—Clifford C. Shaw
*Attorney, Agent, or Firm*—Vickers, Daniels & Young

[57] ABSTRACT

In a welding power supply for creating welding current in a succession of current pulses with a maximum current level and a trailing off state which current pulses passing through a series circuit including an inductor and electrode in welding relationship with a workpiece wherein the power supply has (a) an inverter stage with an input to be connected to a power source, a first terminal at a first electrical polarity when the inverter is on, a second terminal at a second electrical polarity when the inverter is on, and a control to generate an off signal to turn the inverter off and remove current from the terminals to shift said current pulse toward an off state; and, (b) a power switching stage including a transistor based switch having a conduction condition passing current from the first terminal upon creation of a first logic signal and a non-conduction condition blocking current upon creation of a second logic signal, the improvement comprising: a sensor for measuring the instantaneous value of the welding current, a comparator for producing a low current signal when the instantaneous current is at a selected value substantially below the maximum current level and a circuit or program for creating the second logic signal upon production of a low current signal after generation of an off signal whereby the transistor based switch is switched from the conduction condition to the non-conduction condition when the welding current is generally at the selected value.

72 Claims, 7 Drawing Sheets

HIGH CURRENT WELDING POWER SUPPLY

The present invention relates to electric arc welding and more particularly to an improved welding power supply for creating a high welding current in a succession of current pulses.

INCORPORATION BY REFERENCE

The present invention utilizes an inverter of the transistor switching type for converting a three phase input power source to a load coupling transformer from which the AC output of the inverter can be rectified to create current flow between the electrode and workpiece of a welding operation. Such inverters employ a pulse width modulator operated at over 18 kHz for controlling the magnitude of the welding current flowing through the welding operation. These inverters are well known in the art and are generally shown in Blankenship U.S. Pat. No. 5,349,157 and Blankenship U.S. Pat. No. 5,351,175. These patents are incorporated by reference herein as background information illustrating a three phase inverter with current controlled by a high frequency pulse width modulator directing current pulses to the output transformer of the inverter. These patents illustrate the concept of a three phase inverter using a pulse width modulator with an error amplifier for controlling the current at the output of the inverter, which current is used in a welding operation.

BACKGROUND OF THE INVENTION

To provide an AC welding operation, in particular for AC MIG welding, it has been suggested to use an output coupling transformer for the output stage of a transistor switching network type inverter with a secondary winding on the output transformer to create a generally positive terminal and a generally negative terminal. By using an inductor and two transistor based switches, such as IGBTs, a positive current pulse can be directed through the welding operation followed by a negative current pulse. The positive current pulse is created by closing a first switch coupling the positive terminal at the output of the inverter through the electrode and workpiece to the negative or grounded terminal. To reverse the current flow and cause a negative current pulse, the welding operation is connected to the negative terminal at the output of the inverter by a second transistor based switch. Each transistor based switch is in series with the electrode and workpiece together with a portion of a current sustaining inductor. By alternately closing the first switch when the second switch is opened and opening the first switch when the second switch is closed, an AC welding process is created. This process includes a succession of positive and negative current pulses. This architecture for creating an AC welding process has proven quite successful; however, when the welding current is high, i.e. over about 200 amperes, the snubbers in parallel with the first and second transistor based switches are very expensive and quite large. These snubbers had to maintain a high voltage across the switches when one pulse was turned off and the next pulse was turned on. Such inverter power supplies for high welding currents have been successful in AC arc welding so long as the high voltages during the switching operation from one polarity to the opposite polarity was adequately handled. This was a distinct disadvantage of using the inverter based power supply for high welding currents.

THE INVENTION

It was found that switching high welding currents created by a switching type inverter operated by a pulse width modulator would cause high voltages due to the inductive reactance in the welding operation and the speed at which the current must be switched between polarities. The induced voltage during a shift between a positive polarity and a negative polarity in an AC welder of the type defined above is equal to the inductive reactance times the derivative of current. Thus, the voltage can be very difficult to suppress. For that reason, energy absorbing snubber circuits of various designs have been used to reduce or control the induced voltage when switching high welding currents between a positive polarity and a negative polarity. High currents in this regard mean generally above about 200 amperes and exceeding 1,000–1,200 amperes. The snubber circuits necessary for handling these high voltages all involve either high losses and/or high cost. This high voltage is the inductance of the welding circuit multiplied by the change in instantaneous current per unit time during the switching operation. Since the transistors used in the welding operation at the output of the inverter have a fixed time needed for turning the switch off to stop conduction, the induced voltage to be handled by the snubber is proportional to the magnitude of the current at the time the switch begins to turn off and transitions between on and off. For that reason, in the past, circuits used in high current switching applications, such as electric arc welders, normally included elaborate snubber designs as discussed above to suppress the high voltage spikes occurring when the switch is turned off.

THE INVENTION

The transient voltages when switching high currents at the output of the inverter stage are drastically reduced by the present invention in an AC welder of the type driven by a pulse width modulator operated switching inverter, especially one driven by a three phase power source. The invention has been tested on a 1200 ampere, AC inverter based power supply wherein the output current was reduced to 150 amperes before the switch was turned off at the trailing edge of each current pulse to reverse the polarity of the welding current. When one switch is turned off, the other switch is turned on to create the opposite polarity current pulse, which current immediately shifts to 150 amperes in the opposite polarity and then quickly to the maximum current through the inductor in the welding circuit in the opposite direction. By turning off the inverter before switching a high current pulse off, the current in the pulse being removed decays rapidly to a low current level. Consequently, switching between polarities is accomplished at a low current value, which low value was in the example set at 150 amperes. In this example, the induced voltages across the switches, as they are turned off, were significantly reduced. Indeed, at 1200 amperes the snubber could be removed when the switch value of the current was set low. The snubber voltage forces were reduced so as to permit higher AC switching frequencies, without increasing the power handling requirements of the snubbers.

In accordance with the invention, there is provided an improvement in a welding power supply for creating a welding current in a succession of current pulses whereby the pulses have a maximum current level and a trailing off state. Thus, each of the current pulses, which in the preferred embodiment involves successive positive and negative current pulses, shift to a maximum current level generally above about 200 amperes. The power supply has an inverter stage with an input to be connected to a power source, preferably three phase, a first terminal at a first electrical polarity when the inverter is on, a second terminal at a second electrical polarity when the inverter is turned on and a ground terminal. In the invention, a control generates an off signal to turn the inverter stage off and, thus, remove the high current from the terminals. This deactivation of inverter stage shifts the current pulse toward an off state. When the inverter stage is turned off, the current of the pulse decays toward zero current. In the normal use of the power supply, the inverter stage stays on and output switches are used to shift from negative to positive polarity. This produced the problems discussed in the background of this invention.

In accordance with the invention, even though the output switches are used to reverse polarity, the inverter stage that creates the current for use in an AC arc welder is turned off allowing the current to decay toward zero current when there is to be a polarity reversal. When a low value is reached, the switches are reversed terminating the existing current pulse and immediately creating the next current pulse of opposite polarity. The switches are in a power switching network including two transistor based switches, each having a conduction condition passing current from one of the terminals upon creation of the first logic signal and a non-conduction condition blocking current flow upon creation of a second logic signal. The invention can be used with a single output power switch that produces only pulses of a single polarity. Thus, in a broad sense the invention involves turning off the inverter stage, allowing the current pulse to decay to a selected current level and then switching off the output power switch to terminate the current pulse. However, the preferred embodiment of the invention is used for AC arc welding. There are two current pulses. When one output power switch is turned on the other output power switch is turned off and vice versa so that opposite polarity current pulses are created in succession. Each of the current pulses has a trailing edge which trailing edge is created by turning off the inverter for a short time necessary to reduce the current of the pulse. Then the current pulse is terminated by applying the second logic signal to the switch thereby shifting the switch into the non-conduction condition. In practice, the first logic signal for each power switch, whether a single switch DC unit or a two switch AC unit, is a logic 1 to turn the switch on. A logic 0 is the second logic signal to turn the switch, or switches, off.

In accordance with the invention, a sensor is used to measure the instantaneous value of the welding current, a comparator is used to produce a low current signal when the instantaneous current is at a selected value substantially below the maximum current level of the current pulses and a circuit or program creates the second logic signal for turning a switch off upon production of the low current signal after generation of the signal to turn off the inverter stage. If two switches are used for AC welding, when one current pulse is turned off by its power switch the next current pulse is turned on so the current progresses directly toward maximum current when the inverter stage is subsequently turned back on. The inverter is turned off for only a short period of time before polarity reversal. Because the output inductance of inverter type arc welders is typically a small value, the output current can change quickly. The next current pulse progresses to a maximum current and then holds the maximum current until the next current reversal sequence.

The inverter stage is first turned off and then the switches cause polarity reversal. After the current decays to the selected value in response to the inverter being turned off, the actual switching between the two polarities is effected. Since the induced voltage across the switches is a function of current at switching multiplied by the fixed inductance, the drastic reduction in the change in current during the switch reversing operation in turn drastically reduces the induced voltage. It has been found that 1000–1200 amperes can be switched with little or no snubber. This is an improvement in an AC welder of the type using a high frequency inverter switching network and output switches for creating opposite polarity current pulses.

In accordance with another aspect of the present invention, the inverter stage of the invention is powered by either a single or multiple phase input. Since the invention can be used with a three phase input, the welding operation is easily balanced, whereas prior switching units of this type used for high current welding were single phase power supplies with the resultant unbalanced power. Such unbalance is more of a problem at the high current levels used in the present invention.

In accordance with yet another aspect of the invention, the inverter stage involves a switching network controlled by a pulse width modulator operated at a frequency above about 18 kHz. This pulse width modulator operates the switches in the inverter stage at a high rate. The average welding current of the AC welder is conveyed to an error amplifier for controlling the average current of the welding operation by changing the duty cycle of the pulse modulator in accordance with standard inverter practice. The current pulses created at the output of the power supply using the present invention is relatively low, i.e. less than about 400 Hz. Indeed, the AC welding operation is practiced in the general range of 40 Hz–200 Hz which is contrasted with the high frequency operation of the inverter stage.

In accordance with another aspect of the invention, improved power supply can be used to create a single polarity pulse or, alternating polarity pulse. Thus, the welder has a DC negative mode, a DC positive mode or an AC mode. In all modes, the inverter stage is turned off, allowing a decay in the maximum current to a lower, selected current value at which time the current pulse is terminated by opening the switch creating the current pulse. Since the rate of reversing polarity in the AC mode of operation determines the frequency of the AC welding operation, a voltage controlled oscillator or similar software programming is used to change the welding pulse frequency; but, the same frequency is used for the pulse width modulator operating the inverter stage. Thus, the AC welding frequency is easily adjusted by merely changing the rate of the oscillator, other circuit or program controlling the polarity switching network.

It has been found that the present invention can reduce the pulse current at termination of the current pulse to a level less than about 200 amperes and, preferably, to a level in the general range of 100–150 amperes. This low current switching to terminate the trailing edge of the current pulse can be used even when the maximum current of the pulse is 1000–1200 amperes. Heretofore, tremendously large, expensive snubbers were required in such high current AC power supplies.

In accordance with the present invention, the opposite polarity current pulses are created by switching between first and second command signals. One command signal turns one switch on while the other command signal turns the other switch off. This reverses the polarity of the current pulses. A time delay circuit is employed for turning the inverter stage off before the command signals are switched to reverse the polarity of the output welding operation.

In the description of the invention, first and second logic signals are related to a single switch. A logic 1 (first logic signal) turns the switch on and a logic 0 (a second logic signal) turns the switch off. Of course, the digital value of the logic signals could be reversed. In the AC mode of operation, there are first and second command signals. These two command signals are the signals for turning one switch on and the other switch off. These command signals are never the same logic and in accordance with the preferred embodiment of the present invention are created by the Q and $\overline{Q}$ terminals of the flip-flop. When one switch is turned on the other switch is turned off. This is the operation of the command signals. The logic signals relate to a single switch when a logic 1 turns the switch on and a logic 1 turns the switch off. Thus, each command signal has two logic signals indicative of the conductive state of the individual switches controlled by the command signals. When a command signal is called for, this generally means the switch turns on a logic signal.

The primary object of the present invention is the provision of a welding power supply that creates a succession of current pulses having high current levels about 200 amperes and terminates the pulse by turning off a power switch, which power supply is modified whereby the turning off of the power switch occurs at a low current level, substantially below the maximum current of the pulse being terminated.

Another object of the present invention is the provision of a unique AC power supply for electric arc welding, as defined above, which power supply has alternating current pulses with high maximum currents. The pulses are reversed by opening one power switch and closing another power switch when the power switch being opened is carrying a current drastically below the high current of the power supply.

Still a further object of the present invention is the provision of a power supply, as defined above, which power supply is driven by an inverter stage, that is connected to a three phase power source and operated at a high frequency by a pulse width modulator whereby the high frequency inverter stage provides current for a low frequency AC welding operation.

Still a further object of the present invention is the provision of an improved welding power supply for creating a succession of current pulses as defined above, which power supply utilizes transistor based switches, such as IGBTs, which power supply requires little or no snubbing when the polarity reversing switches are turned off.

Yet another object of the present invention is the provision of an AC welding power supply for creating a succession of current pulses, as defined above, which power supply can operate an output frequency as low as 40–60 Hz driven by an inverter stage operated at higher than about 20 kHz and at maximum currents in excess of about 200 amperes. This is a unique AC power supply for electric arc welding that incorporates the advantages of high frequency inverter conversion with the capability of a low frequency output current at high output current levels.

These and other objects and advantages will become apparent from the following description taken together with the accompanying drawings.

PREFERRED EMBODIMENT

Figure 1:
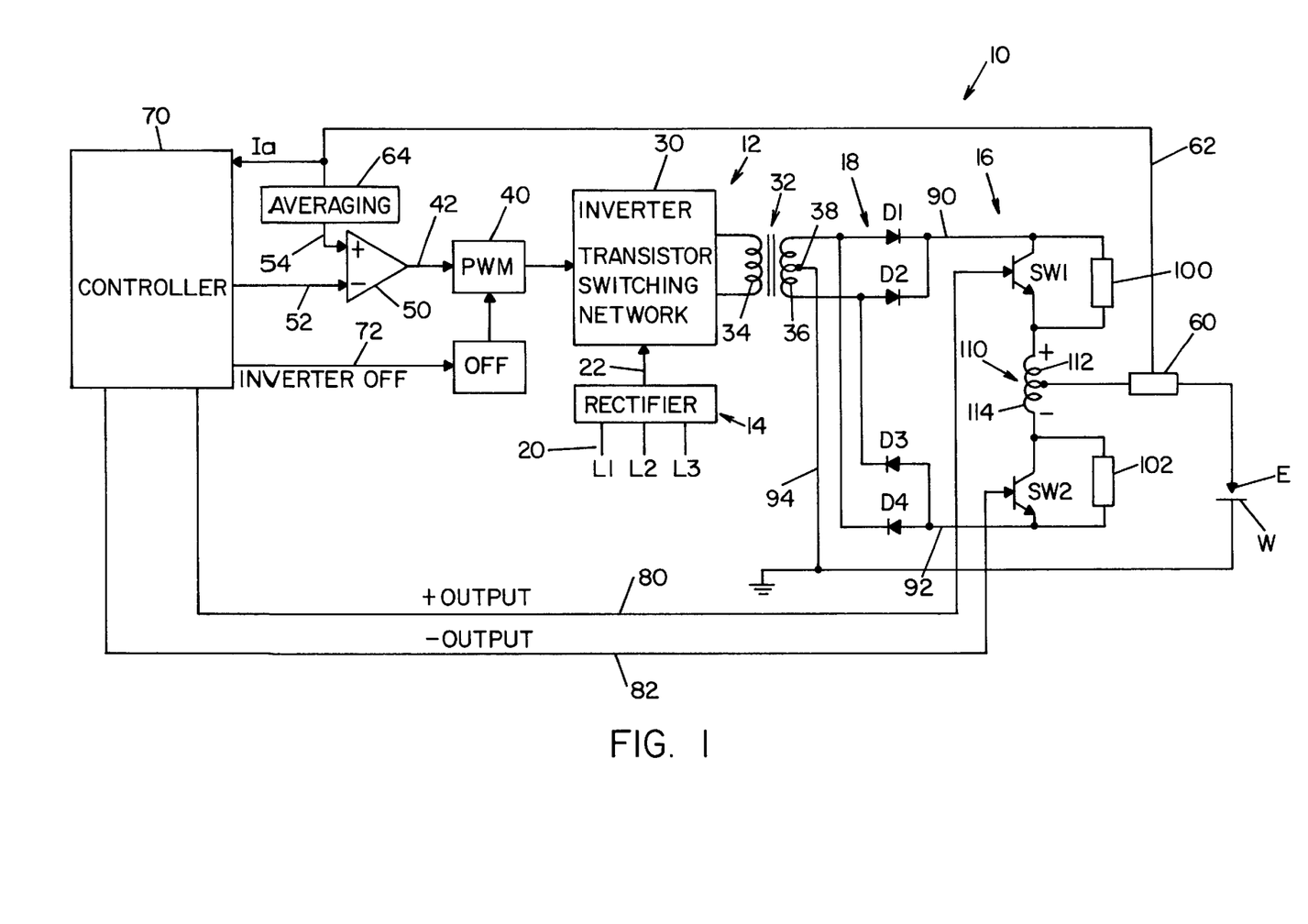
FIG. 1 is a schematic wiring diagram of the inverter stage and output switching network used in practicing the preferred embodiment of the present invention.
Figure 1A:
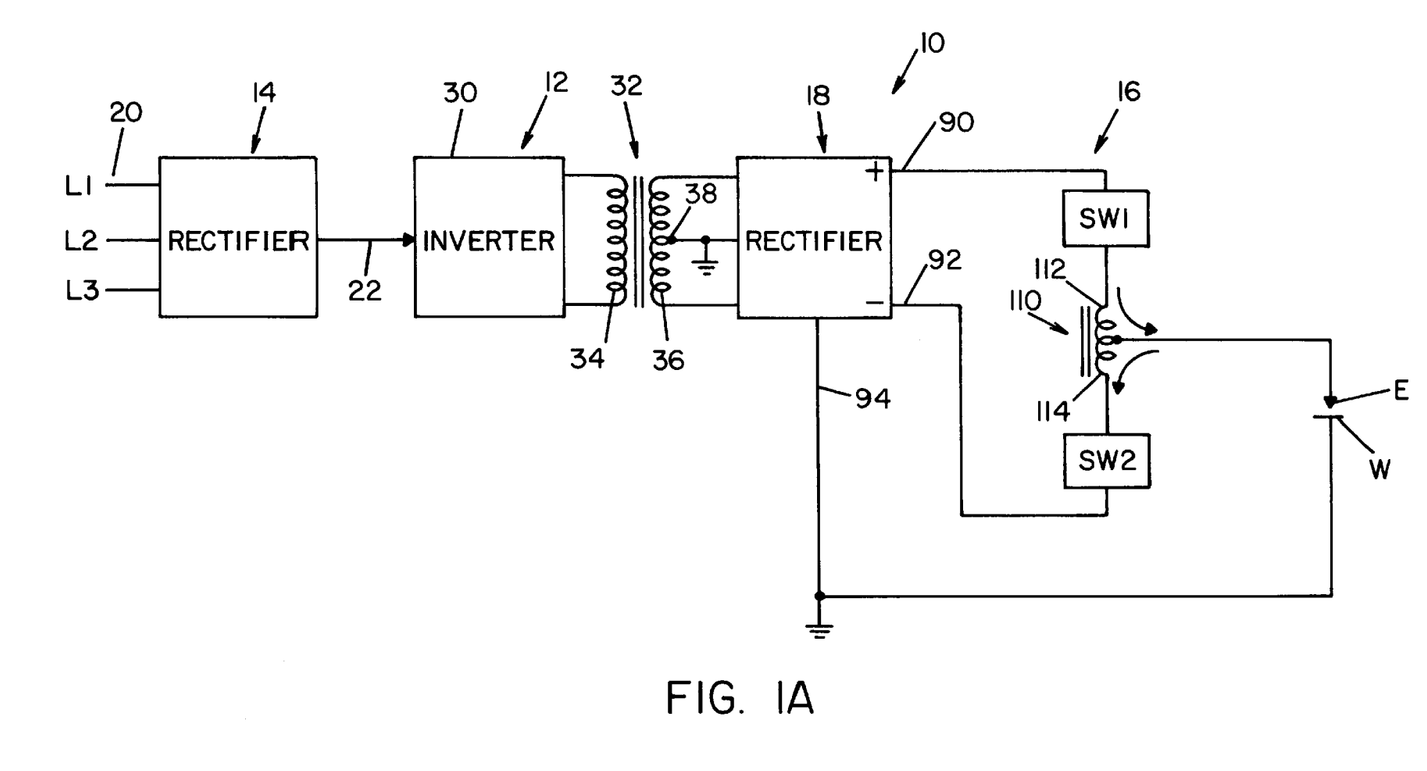
FIG. 1A is a simplified wiring diagram of the power supply shown in FIG. 1 illustrating the reverse switching network used in the preferred embodiment of the present invention.

Referring now to the drawings wherein the showings are for the purpose of illustrating the preferred embodiment only and not for the purpose of limiting the same, FIGS. 1 and 1A show an AC welding supply 10 for passing an alternating current through electrode E and grounded workpiece W. Power supply 10 utilizes a standard inverter stage 12 having a rectifier input 14 and adapted to provide DC current at high levels to output switching network 16, which output network creates the current pulses of power supply 10 for performing a welding operation at workpiece W. To provide DC output terminals forming the input of network 16, a full wave rectifier 18 is connected to the inverter stage so the multiphase input voltage to rectifier 14 is converted to a DC current source having a high maximum current level exceeding 200 amperes and preferably as high as 1000–1200 amperes.

Inverter stage 12 is somewhat standard in architecture and includes an AC input 20 shown as a multi-phase power supply forming an input to rectifier 14 that directs a DC link 22 to the transistor switching network 30 for providing alternating current pulses through primary winding 34 of load transformer 32. A secondary winding 36 that has a center null point 38 is grounded and connected to workpiece W of the welding operation. The transistor switching network includes MOSFET switches or other similar transistor type switches for creating alternating current pulses in primary winding 34. Output transformer 32 has a very low inductance so the network 30 can be turned off quite rapidly. This rapid on and off of a switch network is used extensively in welding power supplies, such as a standard STT welder sold by The Lincoln Electric Company of Cleveland, Ohio and generally shown in Stave U.S. Pat. No. 5,001,326, incorporated by reference herein. The concept of a converter stage with low inductance and capable of being turned off quite rapidly is well known. As shown in this prior patent, and in the other patents incorporated by reference herein, switching network 30 is operated by a somewhat standard pulse width modulator 40 operated at over 18 kHz and preferably between 20–40 kHz as shown in the prior Stava patent. The pulse width modulator control of a transistor switching network forming a converter or inverter is standard technology and the output current of the inverter stage is controlled by the voltage on line 42 from error amplifier 50, which amplifier may be software implemented in response to the voltage level on input line 52 having a voltage or digital word representative of the desired output current of power supply 10. In the invention the desired current level is set to a value exceeding about 200 amperes. The representative signal on input line 52 is compared by amplifier 50 with an average output current of the power supply in the form of the voltage signal or digital word on input line 54. The voltage from current measuring shunt 60 has a value representative of the instantaneous current value in line 62. A current averaging circuit 64 averages the instantaneous current value in line 62, which may be an analog or digital value. Circuit 64 creates an average current representative voltage signal or word in input line 54 of amplifier 50. As so far described, the inverter stage involves standard technology. In accordance with an aspect of the present invention, controller 70 which may be software in a computer, or analog circuit, creates the representative voltage on line 52 in accordance with standard control concepts; however, in addition to the voltage or word in line 52, controller 70 also provides an inverter off signal in line 72. A logic 1 in line 72 immediately deactivates the pulse width modulator to turn inverter state 12 off so that it no longer supplies current to rectifier 18. Controller 70 also creates switch command signals in lines 80, 82 wherein a first logic, i.e. logic 1, immediately turns the corresponding output power switch on and a second logic, i.e. logic 0, which immediately turns the corresponding output power switch off. Full wave rectifier 18 includes diodes D1–D4 to create a positive current terminal 90, a negative current terminal 92 and a ground or common terminal 94 connected to center tap or null point 38 and to workpiece W. Power supply 10 utilizes output switching network 16 for creating high current pulses between electrode E and workpiece W. As illustrated, a first transistor based switch SW1, in the form of an IGBT, is closed upon receiving a command signal in line 80. Closing of switch SW1 creates a current pulse from positive terminal 90 through the positive segment 112 of output inductor 110 and then across the arc of the welding process. A second transistor based switch SW2, in the form of an IGBT, is closed upon receiving a logic 1 in line 82 for creating a negative current pulse through negative segment 114 of inductor 110 and to the negative terminal 52 of rectifier 18 forming the output of the inverter stage 12. Snubbers 100, 102 are connected in parallel across switches SW1, SW2, respectively. Without implementing the basic aspect of the present invention, these snubbers must be quite large and must handle a tremendously high voltage, since the induced voltage equals the value of the inductor segment 112 or 114 and the differential or instantaneous change in current. If the current is in the range of 1000–1200 amperes, a short turn off time gives a high di/dt. The induced voltage is tremendously high and must be accommodated by snubbers 100, 102. The power supply as so far described for use in a high current AC welding operation is new and can handle high currents exceeding 200 amperes and indeed high currents exceeding 1000 amperes. This is an advantage in an AC welder for MIG welding. However, the primary aspect of the present invention reduces the size and/or need for snubbers 100, 102.

Figure 2:
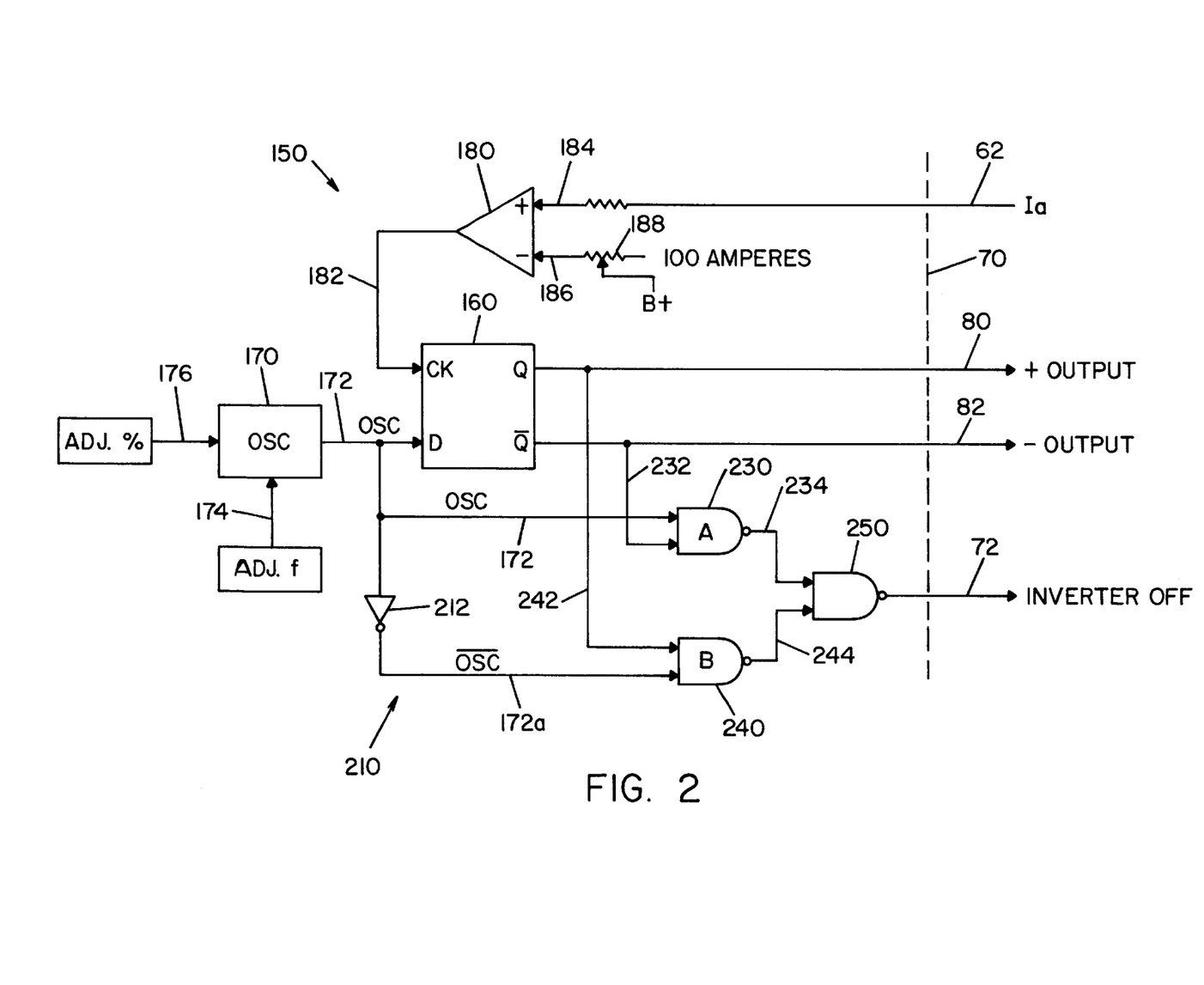
FIG. 2 is a wiring diagram showing the logic network of the control device used in the preferred embodiment for creating the inverter off signal and the first and second command signals.
Figure 3:
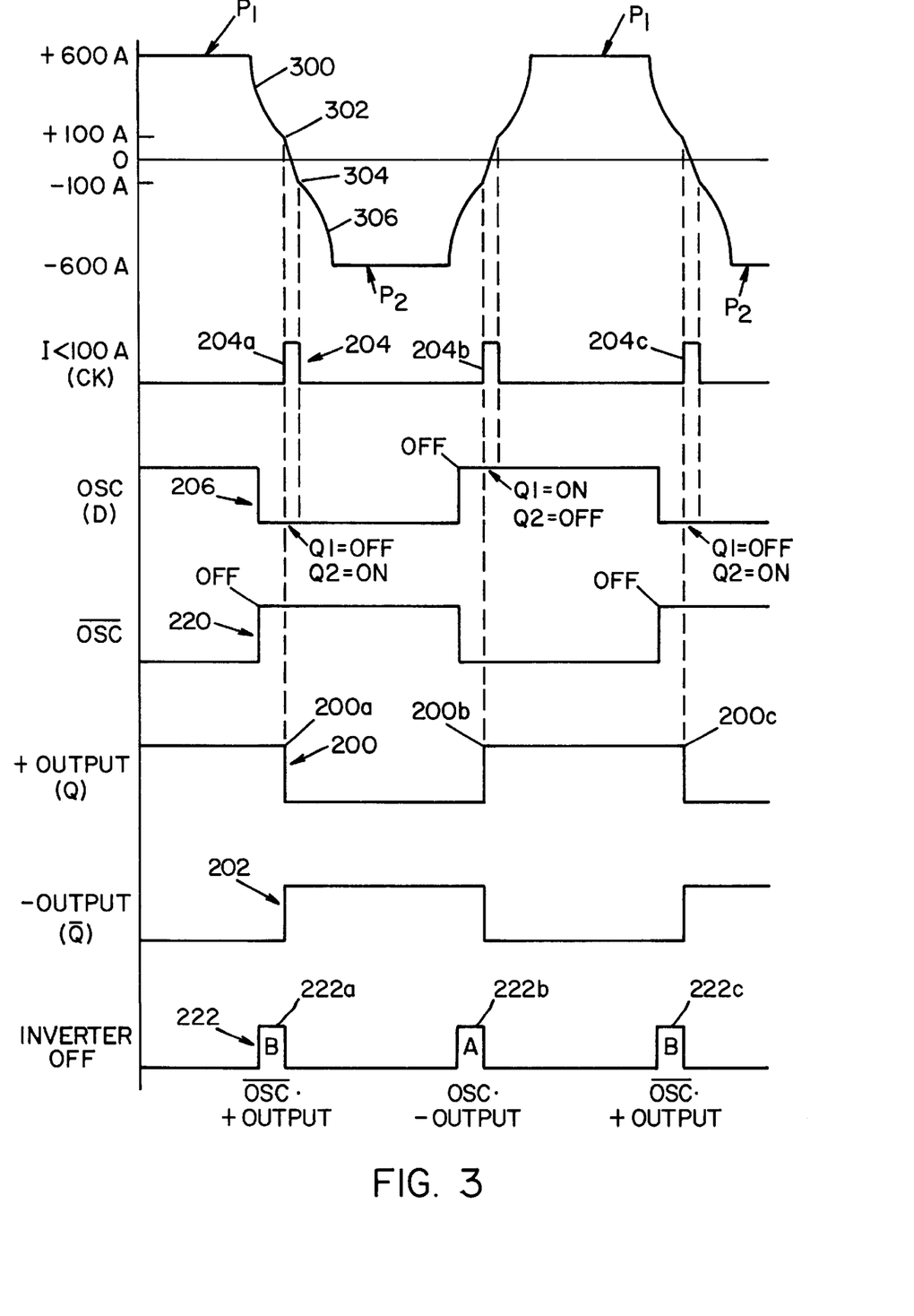
FIG. 3 is a graph showing various wave forms created by implementing the preferred embodiment of the present invention.

In accordance with the present invention, as shown in FIGS. 2 and 3, network 30 of inverter stage 12 is turned off by a signal in line 72 immediately before the logic or command signals in lines 80, 82 are reversed. Thus, the current supply is turned off before the conductive conditions of switches SW1, SW2 are reversed. Many structures could be used to accomplish this control operation. Such structures could be hardwired, software or combinations thereof. For illustrative purposes, a hardwired control circuit or device 150 includes the logic network shown in FIG. 2. The output pulses from the control device or logic network are shown in the time coordinated graphs of FIG. 3 taken together with the resulting alternating current pulses $P_1$, $P_2$ of the current graph at the top of FIG. 3. In the illustrated control circuit or device 150, the logic network includes flip-flop 160 having its Q terminal connected to line 80 and its $\overline{Q}$ terminal connected to line 82. This flip-flop can be software or replayed by another non-coincident device. The logic on these terminals is shown in graphs 200, 202 in FIG. 3. When one command signal is at a logic 1, the other command signal is at a logic 0. Consequently, when one switch SW1, SW2 is turned off the other switch is immediately turned on. This switching action reverses the polarity of the pulses to create an AC output comprising pulses $P_1$, $P_2$ for use in electric arc welding. Data terminal D of flip-flop 160 is connected to output line 172 of oscillator 170 which can be software implemented. The binary logic on data terminal D of flip-flop 160 is shown in graph 206 constituting the output of oscillator 170 appearing in line 172. To transfer the logic from the D terminal to the Q terminal, a clocking pulse must be received at clock terminal CK illustrated as being connected to the output 182 of a voltage level comparator 180. These logic devices are illustrated in analog terms and symbols; however, digital circuits are used also. Flip-flop 160 operates in accordance with standard practice providing the logic shown on graphs 200, 202 at the output of the flip-flop 160 and on lines 80, 82. The logic on these lines controls switches SW1, SW2, respectively. In FIG. 3, a clock pulse 204a appears when the data D shown in graph 206 is a logic 0. This clocking action causes a logic 0 to appear on command signal line 80 and a logic 1 on command signal line 82, as shown in graphs 200, 202. Thus, at point 200a, there is a reversal in the conductive states of switches SW1, SW2. This shifts the current from pulse $P_1$ to pulse $P_2$ to provide a polarity reversal between a positive polarity current pulse $P_1$ and a negative polarity current pulse $P_2$. The command signals on lines 80, 82 are again reversed at point 200b upon receipt of clocking pulse 204b when graph 206 is at a logic 1. Thus, the polarity of the current pulses is again reversed from the negative polarity pulse $P_2$ to the positive polarity pulse $P_1$. Upon the next clocking pulse 204c, another current polarity reversal is effected. Thus, flip-flop 160 creates an AC welding current at the output of power supply 10. Oscillator 170 that creates the signal shown as graph 206 in FIG. 3 is a standard voltage controlled oscillator wherein the voltage input on line 174 changes the frequency of the pulse in output 172. This change in the oscillator rate changes the reversal frequency for the polarity of the pulses shown in the upper graph of FIG. 3. In a like manner, by changing the voltage on line 176 the duty cycle of oscillator 170 can be changed. The duty cycle is shown in FIG. 3 as 50%. By changing the voltage in line 176, in accordance with standard practice, the duty cycle of the oscillations can change to change the duty cycle of the current pulses in the AC output of power supply 10.

Clocking pulses in line 182 as shown by graph 204 in FIG. 3 are created by comparing the voltages on input lines 184, 186. Input line 184 is the instantaneous arc current in the welding operation as sensed by shunt 60. The voltage on input 186 is the output of rheostat 188 which is set to correspond with a voltage on line 184 which is at a selected value preferably in the range of 100–150 amperes and generally less than about 200 amperes. A logic 1 appears in line 182 when the instantaneous current is below the selected value set by rheostat 188, illustrated as 100 amperes. Referring again to graph 204 in FIG. 3, pulses 204a–204c represent the time during which comparator 180 outputs a logic 1 indicating a current less than the selected value at the input 186. By reading the instantaneous value in line 62, and using this value for clocking flip-flops 160, it is assured that the change in polarity will only occur at levels below 100 amperes. This feature is only one aspect of the present invention. It is also necessary to turn off inverter stage 12 by a logic 1 in lines 72 preparatory to the polarity reversal of switches SW1, SW2. This aspect of the invention is accomplished by various structures, one of which is illustrated in FIG. 2 as logic network 210. This network utilizes inverter 212 to invert the logic on line 172 as it appears on line 172*a*. NAND gate 230 has an input 232 with a logic on line 82 which is shown in graph 202 of FIG. 3. The other input to gate 230 is line 172 which is graph 206 in FIG. 3. When the logic of graphs 202 and 206 are both logic 1, a logic 0 appears in line 234. This creates a logic 1 in line 72, which is the output of NAND gate 250. In a like manner, NAND gate 240 has an input 242 connected to line 80 and shown as graph 200 in FIG. 3. The oscillator inverted logic on line 172*a* is shown in graph 202 of FIG. 3. When a logic 1 appears on both graphs 200 and 220, a logic 0 appears at the output 244 of gate 240 to produce a logic 1 in line 72. The logic in line 72 is the inverter off signal shown in graph 222 of FIG. 3. This inverter off signal occurs as soon as the oscillator graph 206 changes logic. Inverter 212 is used in logic network 210 for accomplishing the proper creation of signals turning inverter stage 12 off. As shown in FIG. 3, the off signals 222*a*–222*c* occur immediately before clock pulses 204*a*–204*c* cause switches SW1 and SW2 to reverse. Thus, the inverter is turned off and held off during pulses 222*a*–222*c*. The logic on the output of flip-flop 160 can not change until the next clock pulse occurs. The current as shown in the upper graph decays along line 300 until the reversal point 200*a* is reached at point 302 of the graph. Thereafter, there is an immediate reversal of polarity by changing the logic on lines 80, 82 as shown in graphs 200, 202. This requires a certain transition time inherent in the IGBTs as indicated to occur between point 302 and point 304. Inverter stage 12 is again turned on and the current is increased along line 306 to the maximum level. This same operation occurs during each reversal of the polarity of current pulses $P_1$, $P_2$ as shown in FIG. 3. There is a very short delay between points 302 and 304 caused by the inherent switching time of switches SW1, SW2. These switches are transistor base which indicates they are not commutated. In practice, these switches are IGBTs. No switching energy is lost during the switching operation when using transistor based switches. Of course, other rapid switching devices which change conduction according to the logic on one terminal could be employed in practicing the invention as long as they have the capabilities of handling high currents which can exceed 1000 amperes.

Figure 4:
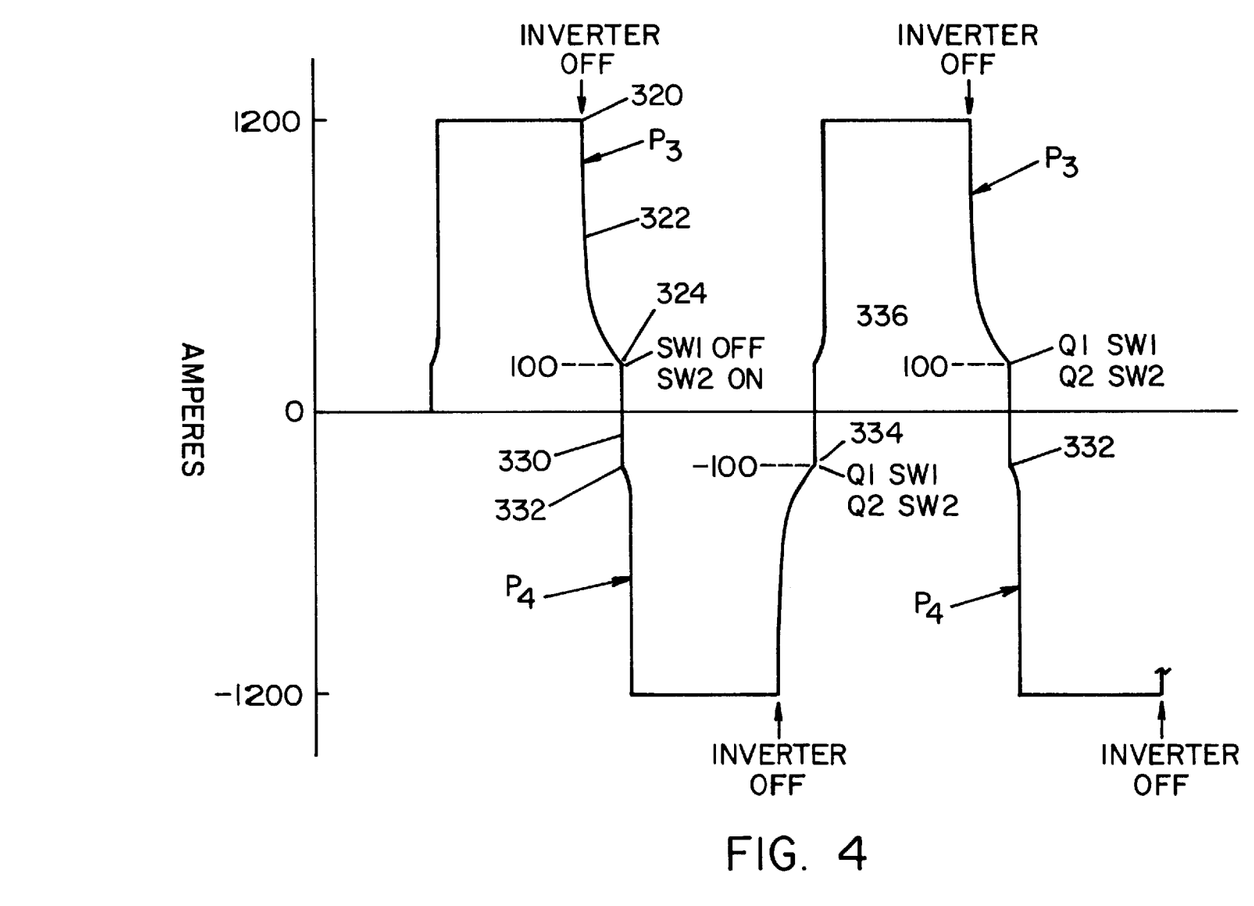
FIG. 4 is a graph schematically illustrating an AC welding current wave form useful in describing the basic aspects of the present invention.
Figure 5:
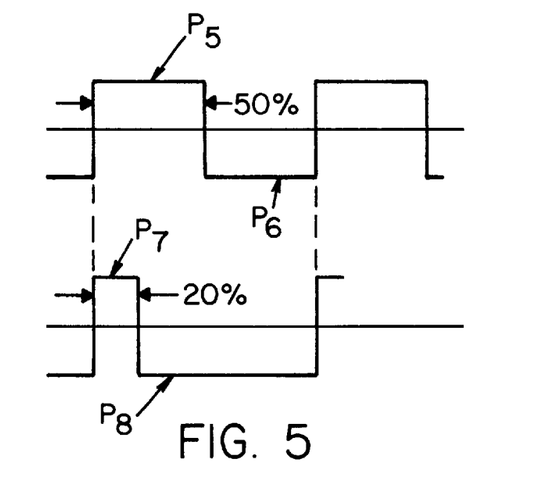
FIGS. 5–7 are graphs showing current wave forms for AC welding using the preferred embodiment of the present invention as shown in FIG. 2.
Figure 6:
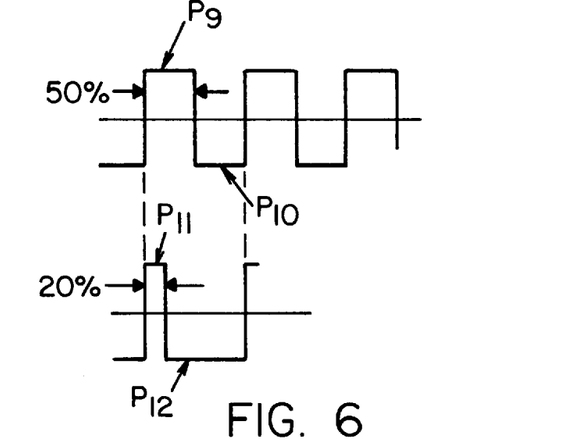
Figure 7:
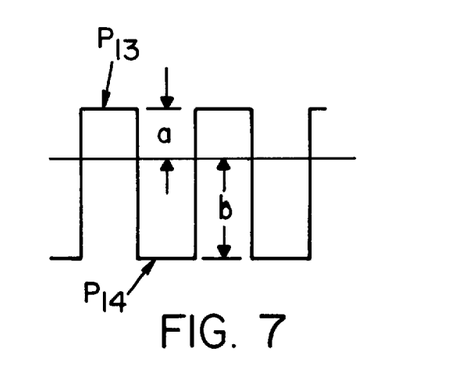

The present invention is schematically illustrated in the AC current shown in FIG. 4 as alternating pulses $P_3$, $P_4$. In this illustration, an inverter off signal occurs at point 320 in pulse $P_3$. The current decays through the output inductor along line 322 until it reaches a low level determined by the selected low current value illustrated as 100 amperes. This current is substantially below the maximum current of 1200 amperes for pulse $P_3$. At switch reversal point 324, switches SW1 and SW2 are reversed according to the logic on lines 80, 82. When this occurs, pulse $P_4$ is immediately created as indicated along generally vertical line 330 which is a theoretical condition to point 332 at which the current is driven to the negative maximum level. As soon as the switch closes, the current is shifted by the tightly coupled center topped inductor to the same level in the opposite polarity. The transition through zero is also accomplished between points 334 and 336. The invention can be used with a standard series inductor in the positive or negative output circuit with the result that the current would not shift between the selected values as rapidly. The AC current shown in FIG. 4 is representative in nature and illustrates the basic concept of the invention which involves turning off the inverter stage, waiting until the current decays to a selected value and then reversing the switches to reverse the polarity of the high current pulses. As previously indicated, the frequency and duty cycle of the output pulses can be varied by changing the software schematically illustrated as oscillator 170 in FIG. 2. This feature is schematically illustrated in FIGS. 5 and 6. In FIG. 5, the duty cycle between pulses $P_5$ and $P_6$ is 50%. As shown in the lower graph, the duty cycle between pulses $P_7$ and pulse $P_8$ is 20% while maintaining the same frequency. In FIG. 6, the frequency is increased so that a 50% duty cycle between pulse $P_9$ and pulse $P_{10}$ produces a smaller individual pulse due to the increased frequency. This increased frequency can have a change in the duty cycle as illustrated wherein pulse $P_{11}$ has a 20% duty cycle with respect to pulse $P_{12}$. The term "duty cycle" is used herein to indicate the relative time between the positive pulse and the negative pulse. This unbalanced condition can be advantageous in certain welding operations where conduction in one direction is substantially different than conduction in the opposite direction. In accordance with another aspect it is possible to change the amplitude of the positive and negative current pulses as shown in FIG. 7 wherein amplitude a for pulse $P_{13}$ is substantially less than the amplitude b for pulse $P_{14}$. This concept allows higher current in one direction than another. Of course, the Pulses $P_5$–$P_{14}$ utilize the present invention wherein the termination of the pulse is effected by first turning off the inverter stage and then reversing the switches SW1, SW2. Other changes in the relative shapes of the alternating pulses can be implemented.

Figure 8:
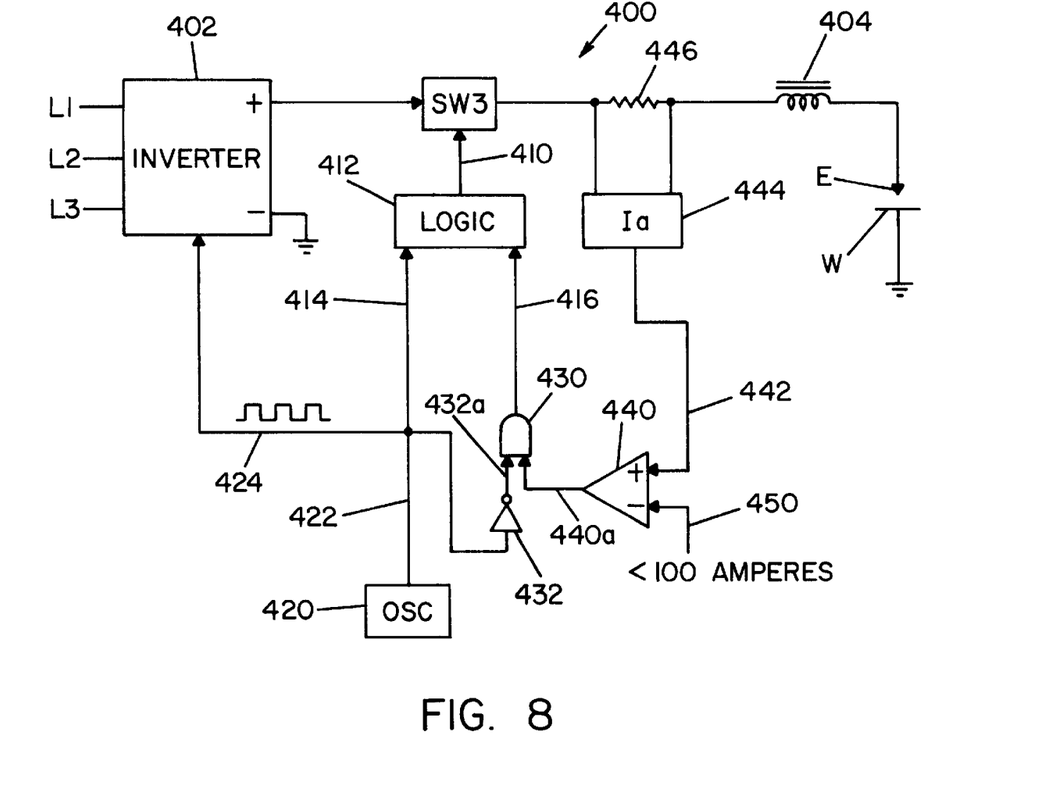
FIG. 8 is a schematic wiring diagram illustrating a modification of the preferred embodiment of the invention; and, FIG. 9 is a graph illustrating the wave form of the current created by the modification of the preferred embodiment as shown in FIG. 8.
Figure 9:
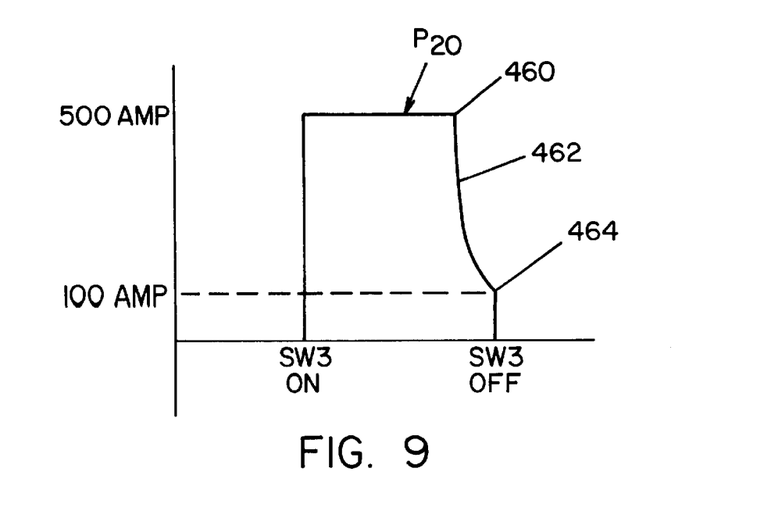

A further modification of the preferred embodiment is illustrated in FIGS. 8 and 9 wherein a welding power supply 400 produces a series of single polarity pulses $P_{20}$ as shown in FIG. 9. In this modification of the invention, only a single switch SW3 is employed for directing the pulse through the arc between electrode E and grounded workpiece W. By this modification, the basic concept of turning off the inverter allowing high current to decay to a low selected value and then turning off the power switch, such as an IGBT, is clearly illustrated. The novel, inventive concept is turning off the high current pulse and then turning off the power switch in a welding power supply of the type driven by a high frequency inverter. In this modification, the inverter 402 has an output controlled by a single switch SW3 for passing current pulse $P_{20}$ through inductor 404 and across electrode E and grounded workpiece W. A command signal in line 410 has a logic 1 when switch SW3 is on and a logic 0 when the switch is off. The logic on line 410 is controlled by logic network 412 having an input 414 for turning the switch on and a logic in line 416 for turning the switch off. Control network, which may be software, is illustrated as a hardwired oscillator 420 having an output 422 for turning inverter 402 on or off as indicated by the logic in line 424. If switch SW3 were on all the time, a square wave current pulse would appear at electrode E. When the inverter is turned on, switch SW3 is turned on by the logic on line 414. However, when the inverter is turned off, switch SW3 is not immediately turned off. To turn switch SW3 off requires a logic signal in line 416. This logic signal is the output of AND gate 430 having an inverter 432 for inverting the logic from oscillator 420. This inverted logic appears on line 432*a* at the input of gate 430. The other input to gate 430 is the output 440a of comparator 440 having a first voltage input in line 442 from current sensor 440 controlled by the instantaneous welding current as measured by shunt 446. The second input to comparator 440 is the voltage on line 450 having a voltage or word representative of a selected current value, such as 100 amperes. Thus, when inverter 402 is turned off, a logic 1 appears in line 432a. As soon as the current decreases to the level determined by the voltage on line 450, a logic 1 appears in the second input 440a of gate 430. This causes a logic 1 to appear in line 416 to open switch SW3 and terminate the current pulse. Thus, when the oscillator is turned on switch SW3 is turned on. This is shown in FIG. 9 at the leading edge of pulse $P_{20}$. The invention involves turning off inverter 402, as indicated at point 460. The current through switch SW3 decays along line 462. When the decaying instantaneous arc current reaches a selected value, indicated to be 100 amperes, gate 430 produces a logic 1 to turn switch SW3 off. This modification of the invention is presented to show the primary aspect of the present invention in the context of a single pulse power supply. The pulses $P_{20}$ occur at a frequency determined by the frequency of oscillator 420 and have a duty cycle of this oscillator, which oscillator is operated in accordance with the discussion of oscillator 170 in FIG. 2. Thus, a single series of pulses can be created using the present invention, or an alternating welding current can be created.

Various changes can be made in the illustrated embodiments of the invention which incorporate generally standard technology, except for the concept of allowing a high current pulse to decay toward a selected value before the current pulse is terminated. This concept, when used in high current welding power supplies, is extremely beneficial and reduces the cost of snubbers 100, 102 as shown in FIG. 1 and, thus, the cost of the high current welding power supply.

What is claimed is:

1. In a welding power supply for creating welding current in a succession of current pulses with a maximum current level and a trailing off state, said current pulses passing through a series circuit including an inductor and electrode in welding relationship with a workpiece, said power supply having an inverter stage with an input to be connected to a power source, a first terminal at a first electrical polarity when said inverter is on, a second terminal at a second electrical polarity when said inverter is on, and a control to generate an off signal to turn said inverter off and remove current from said terminals to shift said current pulse toward an off state; and, a power switching stage including a transistor based switch having a conduction condition passing current from said first terminal upon creation of a first logic signal and a non-conduction condition blocking current upon creation of a second logic signal, the improvement comprising: a sensor for measuring the instantaneous value of said welding current, a comparator for producing a low current signal when said instantaneous current is at a selected value substantially below said maximum current level and a circuit or program for creating said second logic signal upon production of a low current signal after generation of an off signal whereby said transistor based switch is switched from said conduction condition to said non-conduction condition when said welding current is generally at said selected value.

2. The improvement as defined in claim 1 wherein said power source is a three phase power source.

3. The improvement as defined in claim 2 wherein said inverter includes a switching network controlled by a pulse width modulator operated at a frequency above about 18 kHz.

4. The improvement as defined in claim 3 wherein said current pulses have a frequency of less than about 400 Hz.

5. The improvement as defined in claim 1 wherein said inverter includes a switching network controlled by a pulse width modulator operated at a frequency above about 18 kHz.

6. The improvement as defined in claim 5 wherein said current pulses have a frequency of less than about 400 Hz.

7. The improvement as defined in claim 1 wherein said current pulses have a frequency of less than about 400 Hz.

8. The improvement as defined in claim 1 wherein said inverter stage involves an output transformer with a primary winding receiving high frequency current pulses and a secondary winding providing current pulses to said terminals.

9. The improvement as defined in claim 1 wherein current pulses all have a given electrical polarity.

10. The improvement as defined in claim 1 wherein said succession of pulses includes pulses alternating between positive current pulses and negative current pulses.

11. The improvement as defined in claim 10 wherein said power source is a three phase power source.

12. The improvement as defined in claim 10 wherein said inverter includes a switching network controlled by a pulse width modulator operated at a frequency above about 18 kHz.

13. The improvement as defined in claim 12 wherein said current pulses have a frequency of less than about 400 Hz.

14. The improvement as defined in claim 10 wherein said current pulses have a frequency of less than about 400 Hz.

15. The improvement as defined in claim 10 including means for creating said positive and negative pulses and means for adjusting the frequency of said pulses.

16. The improvement as defined in claim 15 wherein said current pulses have a frequency of less than about 400 Hz.

17. The improvement as defined in claim 10 including means for adjusting the relative time between said positive and negative current pulses.

18. The improvement as defined in claim 17 including means for creating said positive and negative pulses and means for adjusting the frequency of said pulses.

19. The improvement as defined in claim 18 wherein said current pulses have a frequency of less than about 400 Hz.

20. The improvement as defined in claim 17 wherein said current pulses have a frequency of less than about 400 Hz.

21. The improvement as defined in claim 10 including means for adjusting the relative amplitude of said positive and negative current pulses.

22. The improvement as defined in claim 21 including means for adjusting the relative time between said positive and negative current pulses.

23. The improvement as defined in claim 22 wherein said current pulses have a frequency of less than about 400 Hz.

24. The improvement as defined in claim 21 wherein said current pulses have a frequency of less than about 400 Hz.

25. The improvement as defined in claim 1 wherein said selected current value is less than about 200 amperes.

26. The improvement as defined in claim 25 wherein said selected current value is in the general range of 100–150 amperes.

27. The improvement as defined in claim 25 wherein said power source is a three phase power source.

28. The improvement as defined in claim 25 wherein said inverter includes a switching network controlled by a pulse width modulator operated at a frequency above about 18 kHz.

29. The improvement as defined in claim 25 wherein said current pulses have a frequency of less than about 400 Hz.

30. The improvement as defined in claim 25 wherein said succession of pulses includes pulses alternating between positive current pulses and negative current pulses.

31. In a welding power supply for creating a succession of positive and negative current pulses by an inverter with said positive current pulses passing through a first inductor segment and an electrode in series with a workpiece by closing a first transistor based switch upon receipt of a first command signal and said negative current pulses passing through a second inductor segment and said electrode by closing a second transistor based switch upon receipt of a second command signal, the improvement comprising a control device with reversing means for switching between said first and second command signals to reverse the polarity of said current pulses, and delay means for turning said inverter off before said command signals are reversed.

32. The improvement as defined in claim 31 wherein said delay means includes means to determine when said current pulses drop to a current of a selected value and means for activating said reversing means when said current drops to said selected value.

33. The improvement as defined in claim 32 wherein said inverter includes a switching network controlled by a pulse width modulator operated at a frequency above about 18 kHz.

34. The improvement as defined in claim 32 wherein said current pulses have a frequency of less than about 400 Hz.

35. The improvement as defined in claim 32 wherein said selected current value is less than about 200 amperes.

36. The improvement as defined in claim 35 wherein said selected current value is in the general range of 100–150 amperes.

37. The improvement as defined in claim 31 wherein said inverter includes an input to be connected to a multi-phase source.

38. The improvement as defined in claim 31 wherein said inductor segments are a part of a single inductor.

39. The improvement as defined in claim 31 wherein said inverter includes a switching network controlled by a pulse width modulator operated at a frequency above about 18 kHz.

40. The improvement as defined in claim 39 wherein said current pulses have a frequency of less than about 400 Hz.

41. The improvement as defined in claim 31 wherein said current pulses have a frequency of less than about 400 Hz.

42. The improvement as defined in claim 31 wherein said selected current value is less than about 200 amperes.

43. The improvement as defined in claim 42 wherein said selected current value is in the general range of 100–150 amperes.

44. The improvement as defined in claim 31 wherein said reversing means is a logic flip-flop wherein the Q logic is said first signal and said $\overline{Q}$ logic is said second command signal.

45. The improvement as defined in claim 44 wherein said delay means includes a logic network wherein an oscillator output is combined with one of said logic signals to turn said inverter off preparatory to initiation of the other of said logic signals.

46. The improvement as defined in claim 31 wherein said delay means includes a logic network where an oscillator output is combined with one of said command signals to turn said inverter off preparatory to initiation of the other of said command signals.

47. The improvement as defined in claim 31 wherein said delay means includes means for sensing the instantaneous welding current and means for activating said reversing means when said instantaneous current is at a selected value.

48. A method of creating welding current in a succession of current pulses with a maximum current level and a trailing off state, said current pulses passing through a series circuit including an inductor and electrode in welding relationship with a workpiece, said power supply having an inverter stage with an input to be connected to a power source, a first terminal at a first electrical polarity when said inverter is on, a second terminal at a second electrical polarity when said inverter is on, and a control to generate an off signal to turn said inverter off and remove current from said terminals to shift said current pulse toward an off state; and, a power switching stage including a transistor based switch having a conduction condition passing current from said first terminal upon creation of a first logic signal and a non-conduction condition blocking current upon creation of a second logic signal, the method comprising:
  (a) measuring the instantaneous value of said welding current;
  (b) producing a low current signal when said instantaneous current is at a selected value substantially below said maximum current level; and,
  (c) creating said second logic signal upon production of a low current signal after generation of an off signal whereby said transistor based switch is switched from said conduction condition to said non-conduction condition when said welding current is generally at a said selected value.

49. The method as defined in claim 48 wherein said power source is a three phase power source.

50. The method as defined in claim 48 wherein said inverter includes a switching network controlled by a pulse width modulator operated at a frequency above about 18 kHz.

51. The method as defined in claim 48 wherein said current pulses have a frequency of less than about 400 Hz.

52. The method as defined in claim 48 wherein said succession of pulses includes pulses alternating between positive current pulses and negative current pulses.

53. The method as defined in claim 48 including:
  (d) creating said positive and negative pulses and means for adjusting the frequency of said pulses.

54. The method as defined in claim 48 wherein said selected current value is less than about 200 amperes.

55. The method as defined in claim 54 wherein said selected current value is in the general range of 100–150 amperes.

56. A method for creating a succession of positive and negative current pulses by an inverter with said positive current pulses passing through a first inductor segment and an electrode in series with a workpiece by closing a first transistor based switch upon receipt of a first command signal and said negative current pulses passing through a second inductor segment and said electrode by closing a second transistor based switch upon receipt of a second command signal, the method comprising:
  (a) switching between said first and second command signals to reverse the polarity of said current pulses; and,
  (b) turning said inverter off before said command signals are switched.

57. The method as defined in claim 56 further including:
  (c) determining when said current pulses drop to a current of a selected value; and,
  (d) activating said reversing act when said current drops to said selected value.

58. A welding power supply for AC high current arc welding at an electrode and a grounded workpiece, said power supply comprising an inverter for converting AC voltage to a DC current source having a maximum current of at least 200 amperes with a positive terminal, a negative terminal, a grounded terminal and an output switching network including a first transistor based switch in series with said positive terminal, a first inductor segment, said electrode and said grounded workpiece, a second transistor based switch in series with said negative terminal, a second inductor segment, said electrode and said grounded workpiece and control means for alternately turning said first switch on and said second switch off at a first switch reversing point and turning said second switch on and said first switch off at a second switch reversing point to create an AC high welding current with alternate positive and negative current pulses for electric arc welding, wherein said inverter has low inductance and means for turning said inverter off upon receipt of an inverter off signal and control means for creating said inverter off signal in advance of said reversing points.

59. A welding power supply as defined in claim 58 including means for setting said reversing points at a selected current value generally below about 200 amperes.

60. A welding power supply as defined in claim 59 wherein said positive and negative current pulses have a frequency of less than about 400 Hz.

61. A welding power supply as defined in claim 58 wherein said inverter includes a pulse width modulated switching network operated at a high frequency generally greater than about 18 kHz.

62. A welding power supply as defined in claim 61 wherein said positive and negative current pulses have a frequency of less than about 400 Hz.

63. A welding power supply as defined in claim 62 wherein said inverter maximum current is generally greater than 1000 amperes.

64. A welding power supply as defined in claim 61 wherein said positive and negative current pulses have a frequency of less than about 400 Hz.

65. A welding power supply as defined in claim 58 wherein said positive and negative current pulses have a frequency of less than about 400 Hz.

66. A welding power supply as defined in claim 65 wherein said inverter maximum current is generally greater than 1000 amperes.

67. A welding power supply as defined in claim 65 including means for adjusting the frequency of said pulses.

68. A welding power supply as defined in claim 58 including means for adjusting the frequency of said pulses.

69. The improvement as defined in claim 58 including means for adjusting the relative time between said positive and negative current pulses.

70. The improvement as defined in claim 58 including means for adjusting the relative amplitude of said positive and negative current pulses.

71. The improvement as defined in claim 58 wherein said inverter includes an input to be connected to a multi-phase source.

72. The improvement as defined in claim 58 wherein said inductor segments are a part of a single inductor.

* * * * *